(12) United States Patent
Delgado et al.

(10) Patent No.: US 7,162,429 B1
(45) Date of Patent: Jan. 9, 2007

(54) SYSTEM AND METHOD FOR MANAGING SPONSORSHIPS

(75) Inventors: Marcus Delgado, Duluth, GA (US); Sandra J. Evans, Atlanta, GA (US); Harrison P. Lantz, Powder Springs, GA (US); Amy L. Sherwood, Marietta, GA (US); David L. Furth, Atlanta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 529 days.

(21) Appl. No.: 10/021,422

(22) Filed: Dec. 19, 2001

Related U.S. Application Data

(63) Continuation-in-part of application No. 09/750,130, filed on Dec. 29, 2000, now Pat. No. 7,127,405.

(51) Int. Cl.
*G06Q 99/00* (2006.01)
*H04K 1/00* (2006.01)
*H04L 9/00* (2006.01)

(52) U.S. Cl. .............. 705/1; 705/50; 705/51; 705/64; 705/80; 726/1; 726/7; 726/26; 726/27; 726/28

(58) Field of Classification Search ............ 705/1, 705/50, 64, 80; 902/1–41; 726/1, 7, 26, 726/27–33
See application file for complete search history.

(56) References Cited

U.S. PATENT DOCUMENTS 5,995,625 A 11/1999 Sudia et al.

| 2001/0049661 | A1* | 12/2001 | Power et al. ................. 705/51 |
|---|---|---|---|
| 2002/0032588 | A1* | 3/2002 | Glazer et al. .................. 705/6 |
| 2002/0091767 | A1* | 7/2002 | Munson ..................... 709/204 |
| 2002/0138300 | A1* | 9/2002 | Hart et al. ..................... 705/1 |
| 2002/0191767 | A1* | 12/2002 | Marchand et al. ..... 379/210.02 |
| 2004/0243464 | A1* | 12/2004 | Beck ........................... 705/14 |
| 2005/0039111 | A1* | 2/2005 | Abe et al. ................. 715/500.1 |

OTHER PUBLICATIONS

John R. Rossiter,"Advertising Communications & Promotion Managemnt", 1997, Irwin/MaGraw-Hill, second edition, pp. 332-347.*
Tony, Thorncroft,"Corporate Friends Needed Sponsorship", Dec. 4, 1998, Financial Times, p. 19.*
Miichael Munson, "The Burgeoning Sponsorship Marketplace", Fund Raising Management, No. 7, vol. 32, Sep. 2001, p. 40.*
Harryy A. Freedman,"The Art Of Corporate Underwriting and Sponsorship", FUnd Raising Management, Sep. 1998, vol. 29, p. 23.*

(Continued)

*Primary Examiner*—Kambiz Abdi
(74) *Attorney, Agent, or Firm*—Hope Baldauff Hartman, LLC

(57) ABSTRACT

A system and method for managing sponsorships by a sponsor, in which the party requesting the sponsorship requests to use content owned and protected by the sponsor, such as trademarks, logos, and copyrighted material. An embodiment of the method involves receiving, at a computer network site, a request for sponsorship from a requestor and responding to the request by sending either an approval or a rejection. If an approval is sent, the method further involves providing the requester with access to content of the sponsor through the site. As part of providing this access, the method can involve requiring the requester to accept an agreement posted on the site. The method can also include monitoring the requestor's actual use of the content.

27 Claims, 14 Drawing Sheets

OTHER PUBLICATIONS

"Seminar looks at Corporate Sponsors", Nov. 11, 1987, The Gazett, Montreal, p. C.4.*

Michael Munson, "Fund Raising Management", Sep. 1, 2001, Gale Group Inc., No. 7, vol. 32; p. 40.*

"Sponsor Direct", Web Site, Jun. 19, 2001, www.sponsordirect.com.*

Cisco web site Logo Program, http:/www.cisco.com/logo/, Oct. 3, 2001.

Sepia web site on SOTISE product, http://www.sepia.com/eng/about.html, Apr. 16, 2000.

Sun Microsystems web site logo program, http:/www.sun.com/logos/dot-com/static.html.

* cited by examiner

| TRADEMARK USE COMPANY PROFILE |

WE WILL NEED SOME INFORMATION ABOUT YOUR COMPANY TO CREATE A NEW TRADEMARK USE ACCOUNT. PLEASE ENTER YOUR COMPANY INFORMATION BELOW:
*ASTERISK (*) DENOTES REQUIRED INFORMATION*

- * FIRST NAME:
- * LAST NAME:
- * COMPANY NAME:
- * CONTACT PHONE: [ ] - [ ] - [ ] EXT. [ ]
- FAX NUMBER: [ ] - [ ] - [ ]
- * E-MAIL ADDRESS:
- COMPANY URL:
- * ACCOUNT PASSWORD:
- * COMPANY ADDRESS:
  CITY: [ ] STATE: [ ] ZIP: [ ]

☐ PLEASE KEEP ME UP TO DATE WITH THE LATEST BELLSOUTH INTELLECTUAL PROPERTY PRODUCTS AND SERVICES ANNOUNCEMENTS VIA E-MAIL.

[ BACK ]  [ SUBMIT ]
— 312

BIPCO HOME | TRADEMARK USE OPTIONS | TRADEMARK USE FAQ'S | CONTACT US | EXIT

FIG. 3B

INTELLECTUAL PROPERTY

TRADEMARK USE EVENT REGISTRATION

PLEASE REGISTER YOUR EVENT BY COMPLETING THE FORM BELOW:

*ASTERISK (*) DENOTES REQUIRED INFORMATION*

* EVENT TITLE:

* EVENT DESCRIPTION:
(MAXIMUM OF 255 CHARACTERS WILL BE SAVED)

* EVENT START DATE: ☐ / ☐ / ☐
(MM/DD/YYYY)

* EVENT DURATION: - PLEASE SELECT - ▼

⎬ 313

PLEASE ENTER YOUR BELLSOUTH CONTACT INFORMATION FOR THIS EVENT:

* CONTACT NAME:

* BUSINESS UNIT:
(EXAMPLE: CONSUMER, SMALL BUSINESS, MOBILITY, ETC.)

* CONTACT PHONE: ☐ - ☐ - ☐

* E-MAIL:

* SPONSOR FEE: $ ☐
(MAXIMUM VALUE IS $50.000)

⎬ 316

314

BACK  SUBMIT — 312

FIG. 3C

| TRADEMARK USE AGREEMENT FOR SMALL SPONSORSHIPS LOGIN |
|---|

THE BELLSOUTH NAME, MARK, OR LOGO (THE "BELLSOUTH MARKS") MAY NOT BE USED BY THIRD PARTIES WITHOUT AGREEING TO THE ONLINE TRADEMARK AGREEMENT OR OBTAINING THE PRIOR WRITTEN CONSENT OF BELLSOUTH INTELLECTUAL PROPERTY MARKETING CORPORATION ("BELLSOUTH"). ANY UNAUTHORIZED USE OF THE BELLSOUTH MARKS IS A VIOLATION OF BELLSOUTH'S INTELLECTUAL PROPERTY RIGHTS.

ORGANIZATIONS CAN REGISTER HERE TO GAIN PERMISSION TO USE THE BELLSOUTH NAME AND LOGO SOLELY FOR REPRODUCTION ASSOCIATED WITH AN EVENT. YOU WILL BE ABLE TO DOWNLOAD APPROVED BELLSOUTH MARK GRAPHICS FOR USE.

ENTER YOUR E-MAIL ADDRESS AND PASSWORD TO GAIN ACCESS TO AN EXISTING COMPANY ACCOUNT.

- IF YOUR COMPANY DOES NOT HAVE AN ACCOUNT, YOU WILL NEED TO CREATE A NEW ACCOUNT.
- IF YOU DO NOT REMEMBER THE ACCOUNT'S PASSWORD, WE CAN E-MAIL IT TO YOU SO THAT YOU CAN ACCESS YOUR COMPANY ACCOUNT.

E-MAIL ADDRESS: [_____]
PASSWORD: [_____] 412
410

[LOGIN]  [E-MAIL PASSWORD]

BIPCO HOME | TRADEMARK USE FAQ'S | CONTACT US

FIG. 4B

```
        TRADEMARK USE AGREEMENT TERMS AND CONDITIONS

422     ┌──────────────────┬─────────────────────────────────┐
        │ ORGANIZATION:    │ BOY SCOUTS TROOP 288            │
        ├──────────────────┼─────────────────────────────────┤
        │ EVENT:           │ CAMP OUTING                     │
        └──────────────────┴─────────────────────────────────┘
```

PLEASE READ THIS TRADEMARK USE AGREEMENT ("AGREEMENT") CAREFULLY BEFORE PRESSING THE "AGREE" BUTTON BELOW. BY PRESSING "AGREE", YOU ARE AGREEING TO BE BOUND BY THE TERMS OF THIS AGREEMENT. IF YOU DO NOT AGREE, PLEASE REMOVE THE BELLSOUTH NAME OR LOGO(S) FROM ANY PROMOTIONAL OR ADVERTISING SIGNS OR ITEMS ASSOCIATED WITH YOUR EVENT.

YOU HAVE THE OPTION TO <u>DISPLAY THE TERMS AND CONDITIONS FOR PRINTING</u>.

1. YOU OR YOUR ORGANIZATION (THE "USER") ACKNOWLEDGE THAT YOU HAVE ENTERED INTO A VALID WRITTEN OR ORAL AGREEMENT (THE "MASTER AGREEMENT") WITH BELLSOUTH CORPORATION OR ITS AFFILIATE OR MANAGERIALLY CONTROLLED COMPANY (THE "SPONSOR") TO SPONSOR AN EVENT (THE "EVENT") CONDUCTED OR CONTROLLED BY THE USER. USER FURTHER ACKNOWLEDGES THAT ANY BREACH OF THE MASTER AGREEMENT SHALL CONSTITUTE AN IMMEDIATE BREACH OF THIS AGREEMENT. TO THE

[ AGREE ]   [ DISAGREE ]

TRADEMARK USE REGISTERED EVENTS

THE BELLSOUTH NAME, MARK, OR LOGO (THE "BELLSOUTH MARKS") MAY NOT BE USED BY THIRD PARTIES WITHOUT AGREEING TO THE ONLINE TRADEMARK AGREMENT OR OBTAINING THE PRIOR WRITTEN CONSENT OF BELLSOUTH INTELLECTUAL PROPERTY MARKETING CORPORATION ("BELLSOUTH"). ANY UNAUTHORIZED USE OF THE BELLSOUTH MARKS IS A VIOLATION OF BELLSOUTH'S INTELLECTUAL PROPERTY RIGHTS.

PLEASE SELECT THE EVENT FOR WHICH YOU WILL BE DOWNLOADING BELLSOUTH LOGOS BY CLICKING ON THE EVENT TITLE. YOU ALSO HAVE THE OPTION TO ADD A NEW EVENT TO THE LIST.

| VIEW | BOY SCOUTS EVENT TITLE(S) | START DATE |
|---|---|---|
| O | CAMP OUTING | 1/1/02 |

BACK TO TRADEMARK USE OPTIONS

BIPCO HOME | TRADEMARK USE OPTIONS | TRADEMARK USE FAQ'S | CONTACT US | EXIT

• BACK TO TOP

COPYRIGHT 2000, BELLSOUTH. ALL RIGHTS RESERVED.
LEGAL NOTICES AND PRIVACY STATEMENT

FIG. 4F

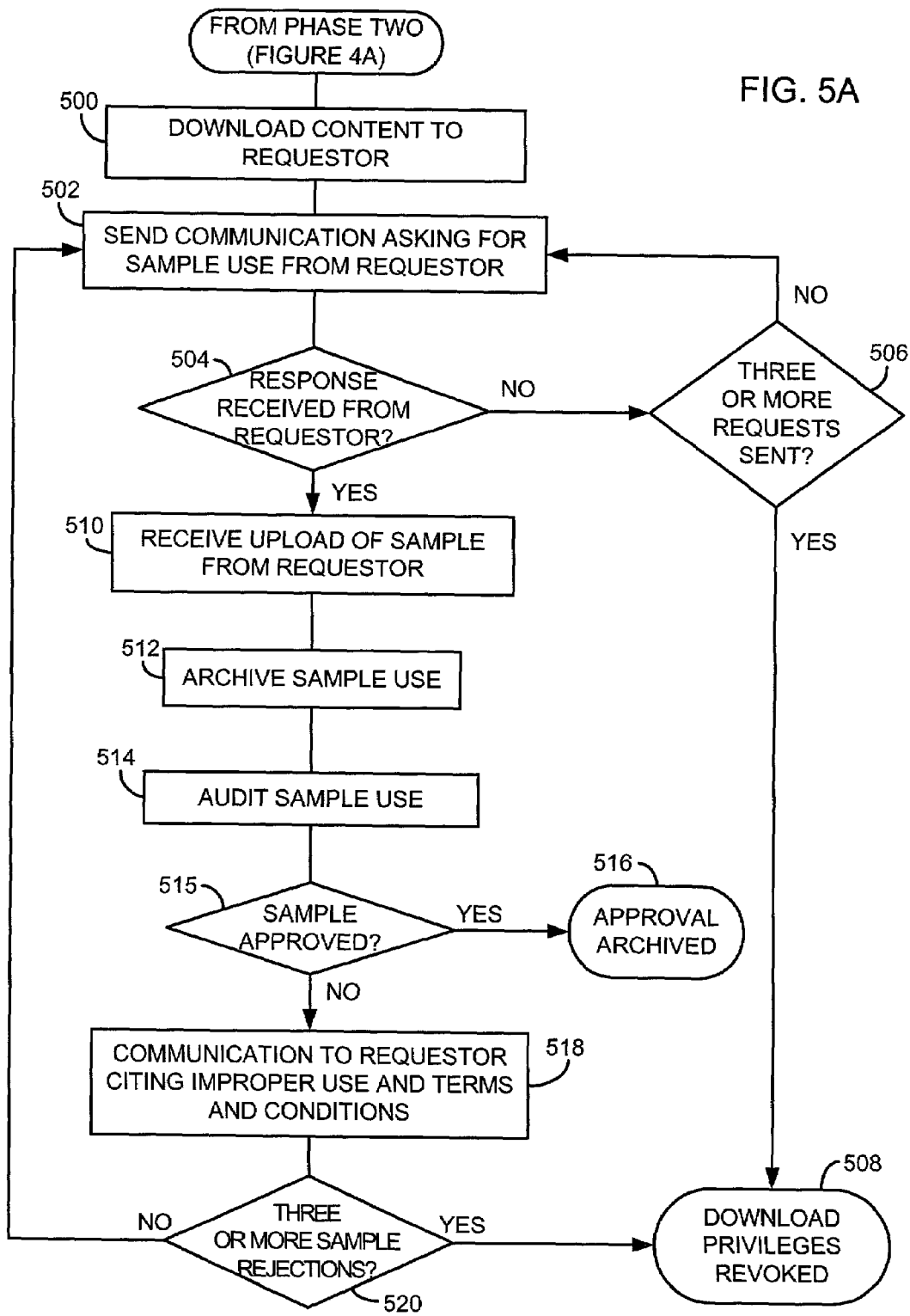

TRADEMARK USE LOGO SLICK PAGE

TO DOWNLOAD A GRAPHICS FOR THE EVENT, TEST EVENT, PLEASE CLICK ON THE SELECTED GRAPHIC'S FILE FORMAT.

532 — PLEASE NOTE, THE BELLSOUTH AFFILIATE AND/OR THE EVENT HOLDER MUST PROVIDE EXAMPLES OF HOW THE BELLSOUTH MARK WILL BE DISPLAYED AT THE EVENT TO THE BIPMAN CORPORATE IDENTITY DIRECTOR, MARY VAN EHRLICH. TELEPHONE (404) 249-2451 OR E-MAIL.

BELLSOUTH LOGO
FORMAT(S): EPS | JPEG — 534

IMAGE IS ABOUT 75% ACTUAL GRAPHIC SIZE. THE GRAPHIC IS OFFERED IN ENCAPSULATED POSTSCRIPT (EPS) AND JPEG FORMATS.

BELLSOUTH LOGO WITH BELL — 534
FORMAT(S): EPS | JPEG

STANDARD BELLSOUTH LOGO PRECEDED BY THE BELL SYMBOL. IMAGE IS ABOUT 75% ACTUAL GRAPHIC SIZE. THE GRAPHIC IS OFFERED IN ENCAPSULATED POSTSCRIPT (EPS) AND JPEG FORMATS.

BELLSOUTH

BELLSOUTH LOGO WITH BELL AND REGISTERED TRADEMARK
FORMAT(S): EPS | JPEG

SYSTEM AND METHOD FOR MANAGING SPONSORSHIPS

This application is a continuation-in-part of U.S. application Ser. No. 09/750,130, filed Dec. 29, 2000 now U.S. Pat. No. 7,127,405.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field of the Invention

The present invention relates generally to electronic commerce and intellectual property transactions, and more particularly, to a system and method for approving sponsorships by a sponsor, for completing agreements concerning the terms and conditions for using content protected by the sponsor, and for downloading and monitoring the use of the protected content.

2. Background of the Invention

Large corporations entertain many requests for charitable donations. These requests ask a corporation to sponsor a charitable organization or event by contributing money or other resources (e.g., employee time). For practical reasons, the corporation cannot agree to every request, and therefore must be selective in deciding which causes to support. In making this choice, the corporation therefore favors charities that promote causes and values aligned with the corporation's own interests, and that generate positive perceptions of the corporation within the community.

In general, the requests for charitable donations come in two varieties, depending on the size of the donation and the potential for publicity. The first type of request asks for a title or flagship sponsorship, which typically involves a large contribution by the corporation and a marquee advertisement of the corporation's participation. This sponsorship is often a part of an ongoing relationship between the corporation and charity, such as an annual sponsorship of a walk-a-thon or benefit dinner. For example, the BellSouth Corporation annually sponsors the BellSouth Classic PGA golf tournament, the proceeds of which benefit several charities. In the year 2000, for example, the tournament donated $700,000 to the Children's Healthcare of Atlanta.

The second type of donation request asks for a small sponsorship. These requests typically ask for small donations, associated with isolated, one-time events. As an example, Troop 288 of the Atlanta Area Council Boy Scouts of America may request from the BellSouth Corporation a sponsorship of $1,000 for a wilderness camp outing.

The amount of effort that the corporation expends in responding to these donation requests depends on whether the request is for a title sponsorship or a small sponsorship. For title sponsorships, with their sizeable donations and significant publicity, corporations devote considerable time and effort to crafting a detailed agreement with the charitable organization. These title sponsorships often involve large, well-organized charities that possess the resources and expertise to handle these formalities. Typically, the parties enter into a formal written agreement that stipulates the terms of the sponsorship, including details such as the amount to be donated by the corporation and how the corporation will be recognized in materials promoting the event. The agreements are consummated through one-on-one telephone conversations and face-to-face meetings between representatives of the corporation and the charity.

A key aspect of these agreements is the use of the corporation's intellectual property, such as trademarks, logos, advertising, collateral materials, and copyrighted materials. To protect such property, the corporation must diligently guard against violations of, for example, its trademarks and copyrighted materials. More specifically, for a trademark owner to maintain rights in its trademark, the owner must ensure the consistent use of the trademark, including characteristics such as color, font, and spelling. The corporation is therefore careful to specify the conditions under which the charity can use the corporation's trademarks and logos. As an example, these guidelines may prohibit the alteration or adaptation of its logos, and may specify what prominence the corporation's logos should assume in relation to other logos promoting the charitable event. These trademark and logo policies establish the corporation's interest in its marks and create a record of due diligence, which is useful for any future enforcement actions against infringers or challengers.

In addition to distributing official trademarks and logos and the guidelines for their use, a corporation can also regularly monitor the use of the trademarks and logos to establish a stronger record of due diligence. In the prior art, corporations typically accomplish such monitoring by, for example, asking the charities for samples of how the trademarks or logos appear in promotional materials. Charities typically provide these samples in a number of conventional ways, including mailings and facsimile transmissions.

For title sponsorships, the corporation is able to address these matters of intellectual property on an individual basis because of the considerable resources devoted to establishing the relationship with the charity, and because of the small number of title sponsorships in which the corporation participates annually. This investment in resources is justified when considering the valuable attention the corporation receives as a principal benefactor.

In contrast to the limited numbers of title sponsorships, large corporations respond to many more requests for small sponsorships. In fact, for nationwide companies having several regional offices, it is not unusual to receive many hundreds of requests annually. Although each of these small sponsorships entails a smaller donation, often for a one-time event, the administrative burden in processing the requests is comparable to that required for title sponsorship agreements. Indeed, for each small sponsorship request, the corporation still must review and approve the request, provide official logo images to the charity, obtain the charity's consent to the terms and conditions of the use of the logo, monitor the charity's use of the logo, and provide brand collateral updates to all parties currently registered. Realistically, however, for these small sponsorships, the small donation and limited public exposure of the event do not justify a huge expenditure of resources by the corporation. The corporation would therefore prefer a more streamlined approach that automatically processes a request for small sponsorship. The process would preferably satisfy the due diligence for which the corporation is responsible in protecting its marks, while at the same time would use as little of the corporation's administrative resources as possible.

As a hypothetical example, consider the donation request mentioned above for the camp outing of Troop 288 of the Atlanta Area Council Boy Scouts of America. The request would likely include a statement of the event to be sponsored, the amount of the requested donation, and particulars about the event, such as the date, time, and location. The representative of the Boy Scouts would most likely contact a public relations employee, a customer service representative, or a marketing representative of the corporation. Often, the contacted person would not have the ultimate authority to approve the sponsorship, the means to forward official corporate trademarks and logos, or the expertise to educate the Boy Scout representative on the proper use of the trademarks and logos.

As this scenario repeats for each of the many small sponsorship requests, the administrative resources of the corporation quickly become overwhelmed. Further complicating the process is the reality that the corporation receives multiple requests at different points of contact within the corporation, spread across different regional offices and business units. Without a central approval mechanism, the corporation lacks a consistent, coherent voice, and has difficulty in tracking and responding to requests. Consequently, its reputation for community involvement can be tarnished.

In response to this need, some corporations have developed trademark and logo licensing programs to handle the large number of requests for trademark and logo use. Two known examples of these programs are the Sun Microsystems Logo and Certification Program and the Cisco Systems Logo Program. According to the Sun Microsystems program (see the Sun Microsystems web site at www.sun.com/logos/dot-com/static.html), a person requesting use of Sun's logo must first read and accept Sun's Trademark Agreement. The requester views the agreement online and enters into the agreement by clicking on an "accept" button, in what is generally known as a "click-wrap" agreement. After accepting the agreement, the requestor completes a registration form and then downloads the Sun image.

In the Cisco program (see the Cisco Systems web site at www.cisco.com/logo/), a certified individual, a program partner, or a company affiliated with Cisco can obtain Cisco logos that advertise the business relationship that the person or company has with Cisco. In each case, the Cisco web site provides the individual or company with general rules on how to use the Cisco logos, along with electronic mail (e-mail) links through which requests must be submitted. The Cisco representatives who receive the e-mail evaluate each request individually and grant permission based on Cisco's discretion. The Cisco web site also posts policies regarding its trademarks and copyrighted materials, and a policy that specifically addresses the use of Cisco trademarks and copyrighted materials on the Web.

Unfortunately, these conventional license tracking systems only partially solve the problems associated with managing sponsorships. In particular, these conventional systems focus narrowly on the trademark and logo aspects of the process, in which a requestor reviews and accepts an agreement, and downloads an image for use in promotional materials. The systems do not, however, address the initial inquiry to the corporation and the corporation's approval of the sponsorship, which must occur before a requestor can even proceed with the procurement of the trademarks or logos. Furthermore, once the image is downloaded, the systems do not monitor the actual use of the trademarks or logos to confirm compliance with the stated guidelines. Thus, prior art systems do not provide any kind of follow-up mechanism to track, archive, or oversee the charities' use of the trademarks and logos.

SUMMARY OF THE INVENTION

The present invention is a system and method for managing sponsorships. Unlike the license tracking systems of the prior art, which address only click-wrap agreements and the downloading of protected content, the present invention encompasses the entire sponsorship process, including the initial request for sponsorship and the subsequent monitoring of the use of the protected content. In particular, the present invention provides a central, automatic approval mechanism with which a sponsoring entity can accept and respond to multiple requests for small sponsorships. A sponsoring entity can use the system and method of the present invention to automatically track sponsorship requests, to obtain consent agreements associated with each request, and to monitor the use of the protected content covered by each agreement. With these capabilities, the present invention enables a sponsoring entity to quickly respond to requests for sponsorship and to maintain a strong, positive presence within its community, all while preserving its administrative resources and establishing a clear record of due diligence in protecting its intellectual property.

According to an embodiment of the present invention, a method for managing sponsorships involves receiving, at a computer network site, a request for sponsorship from a requestor and responding to the request by sending either an approval or a rejection. If an approval is sent, the method further involves providing the requester with access to content of the sponsor through the site. As part of providing this access, the method can involve requiring the requester to accept an agreement posted on the site.

The method can also include monitoring the requestor's actual use of the content by, for example, sending a communication to the requestor asking for a sample use of the content, receiving the sample use from the requestor, and determining whether the sample use complies with the agreement. In one embodiment, the method uses manual inspection to determine whether the sample use complies. In another embodiment, the method electronically analyzes the sample use, using tools such as image recognition, digital rights management, and digital watermarking software.

In another embodiment, monitoring the requestor's actual use of the content involves tracking the content that is accessed by individual requesters.

Accordingly, an object of the present invention is to respond to requests for sponsorships and for protected content (e.g., intellectual property) related to the sponsorship.

Another object of the present invention is to distribute intellectual property while establishing a record of due diligence in protecting the intellectual property.

These and other objects, aspects, and advantages of the present invention are described in greater detail in the detailed description of the invention and the attached materials. Additional features and advantages of the invention will be set forth in the description that follows, will be apparent from the invention, or may be learned by practicing the invention.

BRIEF DESCRIPTION OF THE DRAWINGS

FIGS. 3B and 3C are screen images of exemplary graphical user interfaces for submitting a request for sponsorship, according to an embodiment of the present invention.

FIG. 4B is a screen image of an exemplary graphical user interface for gaining access to secured computer network pages of a sponsor, according to an embodiment of the present invention.

FIG. 4D is a screen image of an exemplary graphical user interface for displaying terms and conditions, according to an embodiment of the present invention.

FIG. 4E is a screen image of an exemplary graphical user interface for displaying terms and conditions for printing, according to an embodiment of the present invention.

FIG. 4F is a screen image of an exemplary graphical user interface displayed in response to a requestor's refusal of terms and conditions, according to an embodiment of the present invention.

FIG. 5A is an exemplary flow chart outlining the download and monitor phase of a method for managing sponsorships, according to an embodiment of the present invention.

FIG. 5B is a screen image of an exemplary graphical user interface for downloading content of the sponsor, according to an embodiment of the present invention.

DETAILED DESCRIPTION OF THE INVENTION

Figure 1:
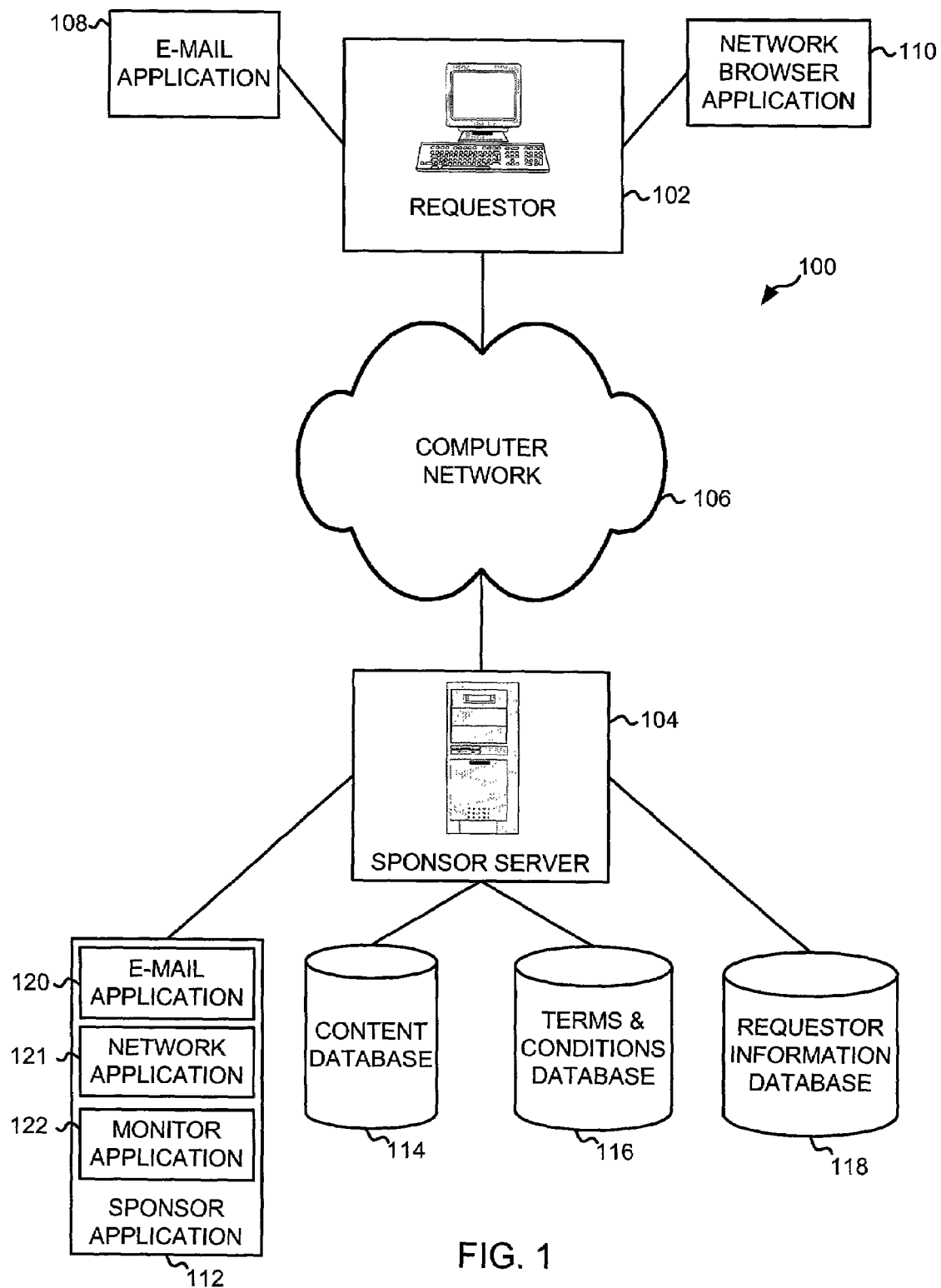
FIG. 1 is a schematic diagram of an exemplary system for managing sponsorships, according to an embodiment of the present invention.

FIG. 1 illustrates a system 100 for managing sponsorships, according to an embodiment of the present invention. As shown, system 100 includes a requestor computer 102 in communication with a sponsor server 104 through a computer network 106. Computer network 106 may be, for example, the Internet or the World Wide Web.

Requestor computer 102 includes an e-mail application 108 and a network browser application 110. An entity requesting a sponsorship (e.g., a charitable organization) uses requestor computer 102 to communicate with the sponsor that is operating server 104. Network browser application 102 enables requestor computer 102 to locate and communicate with sponsor server 104 over computer network 106. This communication could include interacting with a web interface that prompts the entry of data into data fields, which then populate a requester information database 118 (described below). E-mail application 108 enables requester computer 102 to send e-mail to and receive e-mail from sponsor server 104 through computer network 106. Although shown separately, e-mail application 108 and network browser application 110 could, of course, be a single application, or could be parts of other applications of requestor computer 102.

Sponsor server 104 includes a sponsor application 112, a content database 114, a terms and conditions database 116, and a requestor information database 118. An entity that receives requests for sponsorship uses sponsor server 104 to communicate with and respond to the requesters through computer network 106. Although FIG. 1 shows server 104 in communication with only one requester computer 102, one of ordinary skill in the art would appreciate that server 104 could be in communication with multiple requestor computers.

Sponsor application 112 includes an e-mail application 120 for sending and receiving e-mail, a network application 121 for communicating with requestor computer 102 over computer network 106, and a monitor application 122 for monitoring requestors' uses of protected content (discussed in more detail below). Although FIG. 1 shows e-mail application 120, network application 121, and monitor application 122 as separate subcomponents of sponsor application 112, all of the applications could, of course, be individual applications, subcomponents of other applications of sponsor server 104, or various subcombinations of each other.

Content database 114 contains the sponsor's content that the requestor wishes to use, such as trademarks, logos, or other intellectual property associated with the sponsor. Terms and conditions database 116 contains the agreements that requestors must accept before they are able to obtain the content of content database 114. Requestor information database 118 stores data associated with each requester, including, for example, contact information (e.g., e-mail address) and whether a requestor has accepted the terms and conditions. Although, for clarity, FIG. 1 represents databases 114, 116, and 118 as individual databases, one of ordinary skill in the art would appreciate that these databases could be a single database or many separate databases.

Figure 2:
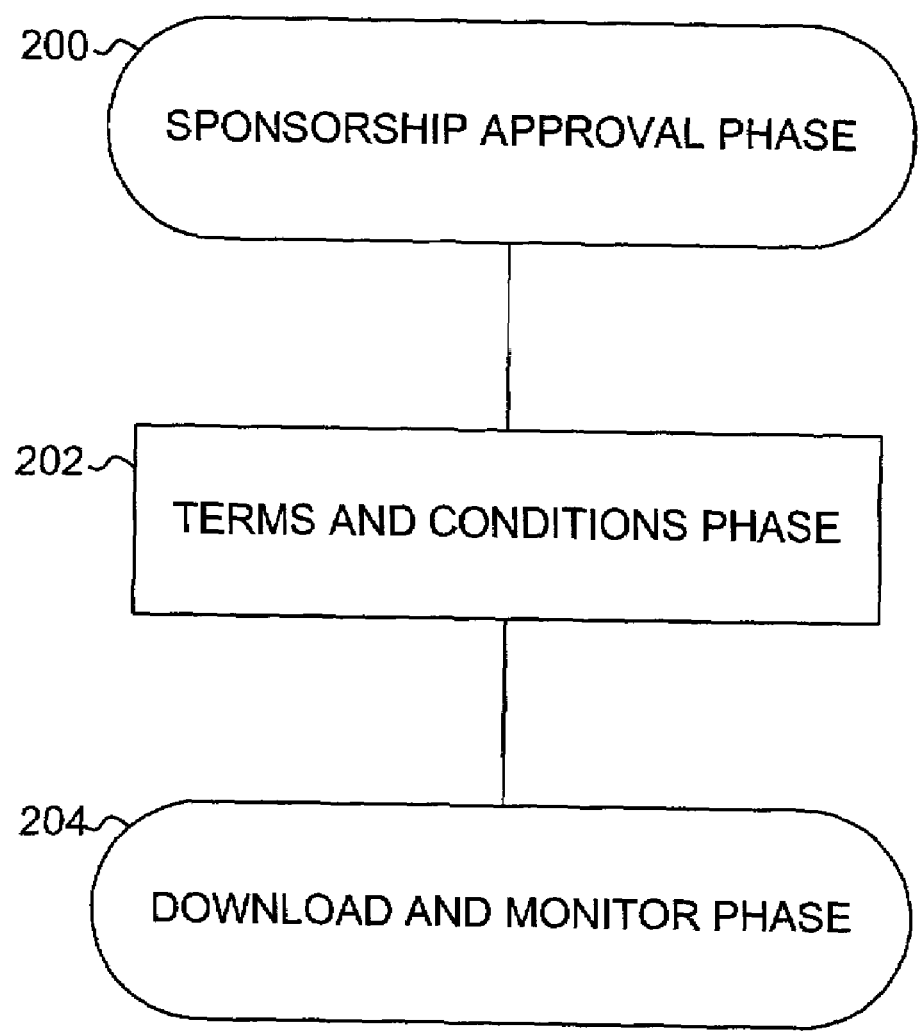
FIG. 2 is an exemplary flow chart outlining a method for managing sponsorships, according to an embodiment of the present invention.

FIG. 2 illustrates an exemplary method for managing sponsorships, according to an embodiment of the present invention. As shown in FIG. 2, the method includes three phases 200, 202, and 204. In the sponsorship approval phase 200, a sponsor receives and responds to a request for sponsorship. After the sponsorship is approved, in the terms and conditions phase 202, the sponsor requires the requestor to accept an agreement that defines conditions for using protected content of the sponsor. Finally, in the download and monitor phase 204, the sponsor provides the requestor with access to the protected content and monitors the requestor's actual use of the content. These three phases 200, 202, and 204 are discussed in more detail below.

Figure 3A:
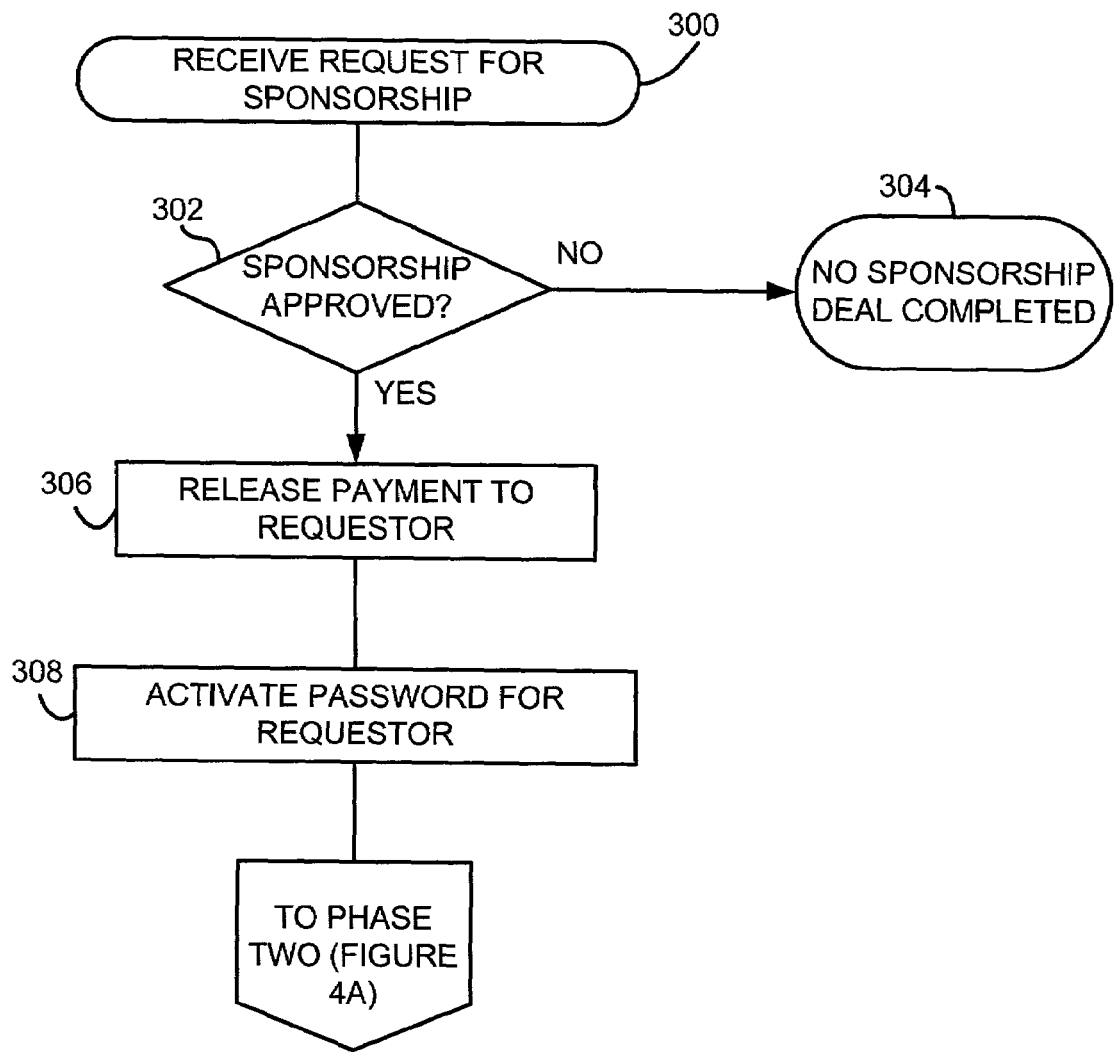
FIG. 3A is an exemplary flow chart outlining the sponsorship approval phase of a method for managing sponsorships, according to an embodiment of the present invention.

With continuing reference to system 100 of FIG. 1, FIG. 3A outlines the sponsorship approval phase 200. This phase 200 begins in step 300 with sponsor server 104 receiving a request for sponsorship from requestor computer 102 through computer network 106. Although any means of electronically forwarding this request is acceptable, as an example, the requestor could use e-mail application 108 to send the request in the form of an e-mail message. Preferably, however, the requestor uses network browser application 110 to submit the request through an online form posted by network application 121. In this manner, using data fields of the form, the sponsor can prompt the requestor for required information, such as a description of the event for which the sponsorship is sought, a date and duration of the event, an e-mail address of the requestor, and the requested donation amount. Sponsor server 104 stores this data in requestor information database 118.

FIG. 3B illustrates an exemplary graphical user interface (GUI) displayed on requestor computer 102, for submitting a request for sponsorship and providing the required information. As shown, the requestor provides contact information 310, including name, address, telephone numbers, and e-mail address. The requester also creates a password 311 that the requester will use to securely access the terms and conditions acceptance process and the content download process (described below). In one embodiment, the requestor's e-mail address (entered in contact information 310) is used as the requestor's login identification, so that the requester has the ability to retrieve password 311 in the event that the requestor forgets it (e.g., the sponsor can send to the requestor's e-mail address an e-mail message listing the password).

As a part of the request for donation, an additional part of the form prompts the requestor for the amount and reason for the sponsorship, and for the contact person at the sponsor who directed the requestor to the web site to register. FIG. 3C illustrates an exemplary GUI displaying this part of the form on requester computer 102. As shown, the requestor provides information about the event 313 (e.g., title, description, start date, and duration), the amount of the sponsor fee 314, and contact information for the contact person 316. The contact information 316 enables the sponsor to track the origin of each sponsorship request, thereby giving the sponsor the ability to funnel multiple requests received at different points of contact to a central tracking and response mechanism. After filling out the data fields of the form, the requestor submits the request for donation to sponsor server 104 by clicking on the submit button 312.

In completing the forms of FIGS. 3B and 3C, a requestor is able to self-register with the sponsor, automatically storing the requestor's profile in requestor information database 118 without causing additional administrative work for the sponsor. The requestor can also return to the forms of FIGS. 3B and 3C at any time to maintain the accuracy of the requestor's profile information (e.g., the requestor can enter a changed telephone number or address). In addition, with the profile information stored in requestor information database 118, the sponsor can, at any time, review the requestor profiles, verify the information contained therein, and change a requestor's ability to access restricted pages of the sponsor's web site.

At the conclusion of step 300, the sponsor has all of the information necessary to decide whether to approve the request for sponsorship. In step 302, the sponsor makes this decision. The outcome of the decision can be based on considerations such as the cause that the requestor is promoting, the requested donation amount, and the amount of charitable funds available to the sponsor.

In one embodiment of the present invention, in step 302, sponsor application 112 automatically decides whether a sponsorship request is approved based on predefined rules. These rules could, for example, be based on a list of approved charities and on prescribed single donation limits and cumulative donation limits for a given period. For example, a sponsor may decide to approve sponsorships only from a list of ten possible charities, to limit any single sponsorship donation to less than $5,000, and to limit the total amount of sponsorship donations to less than $30,000 for a given quarter. A request that violates any of these limitations would be rejected.

Alternatively, in another embodiment of the present invention, in step 302, an employee of the sponsor reviews the request and decides whether it should be approved.

If the sponsor rejects the request ("NO" in step 302 of FIG. 3A), then, in step 304, sponsor application 112 returns a communication conveying the rejection to requestor computer 104. This communication could be, for example, an electronic communication such as an e-mail message sent by e-mail application 120 or a page displayed by network application 121. Alternatively, this communication could involve an employee of the sponsor contacting the requestor to discuss the rejection. If the request is rejected, then the process ends in step 304 with no sponsorship deal completed.

If, in step 302, the sponsor approves the request for sponsorship, then, in step 306, the sponsor releases a payment to the requestor for the amount requested. This payment can be in the form of a conventional paper check or, alternatively, can be an electronic transaction (e.g., electronic funds transfer, or EFT) between sponsor server 104 and requester computer 102.

In an alternative embodiment of the present invention, the requester pays the sponsor for the sponsorship, instead of the sponsor's donating funds to the requestor. For example, the sponsor could be a corporation or celebrity that is endorsing a product made by the requester. To receive the sponsor's endorsement, the requestor would therefore pay the sponsor. Thus, in this alternative embodiment, step 306 would entail the requestor's releasing a payment to the sponsor. The sponsor could facilitate this payment by providing, for example, a credit card payment vehicle.

In step 308, the sponsor activates a password for the requester, noting the activation in requestor information database 118. This password enables the requestor to access secured pages posted by sponsor application 112. These secured pages are only accessible by requestors that have registered a profile in requester information database 118. The secured pages provide the requestor with access to further features of the sponsor's web site (described below) and to general information about how to access content stored in content database 114 (e.g., trademarks and logos). As an example, sponsor application 112 would activate password 311 (FIG. 3B), which the requester entered in step 300.

In an alternative embodiment, sponsor application 112 activates a password associated with the payment that was released to the requestor in step 306. For instance, if the payment was in the form of a conventional paper check, the number of the check could serve as the requestor's password. In this manner, the requestor would receive the password when the requestor receives the check from the sponsor. Similarly, if the payment was electronic, then a password or code could be provided as part of the electronic payment, or perhaps, as a separate e-mail message reporting the electronic payment.

With the password activated, the requester is able to access a first level of secured pages displayed by sponsor application 112. This first level of secured pages does not include access to the downloading of desired content. The conclusion of step 308 marks the end of the sponsorship approval phase (phase 200 of FIG. 2).

Figure 4A:
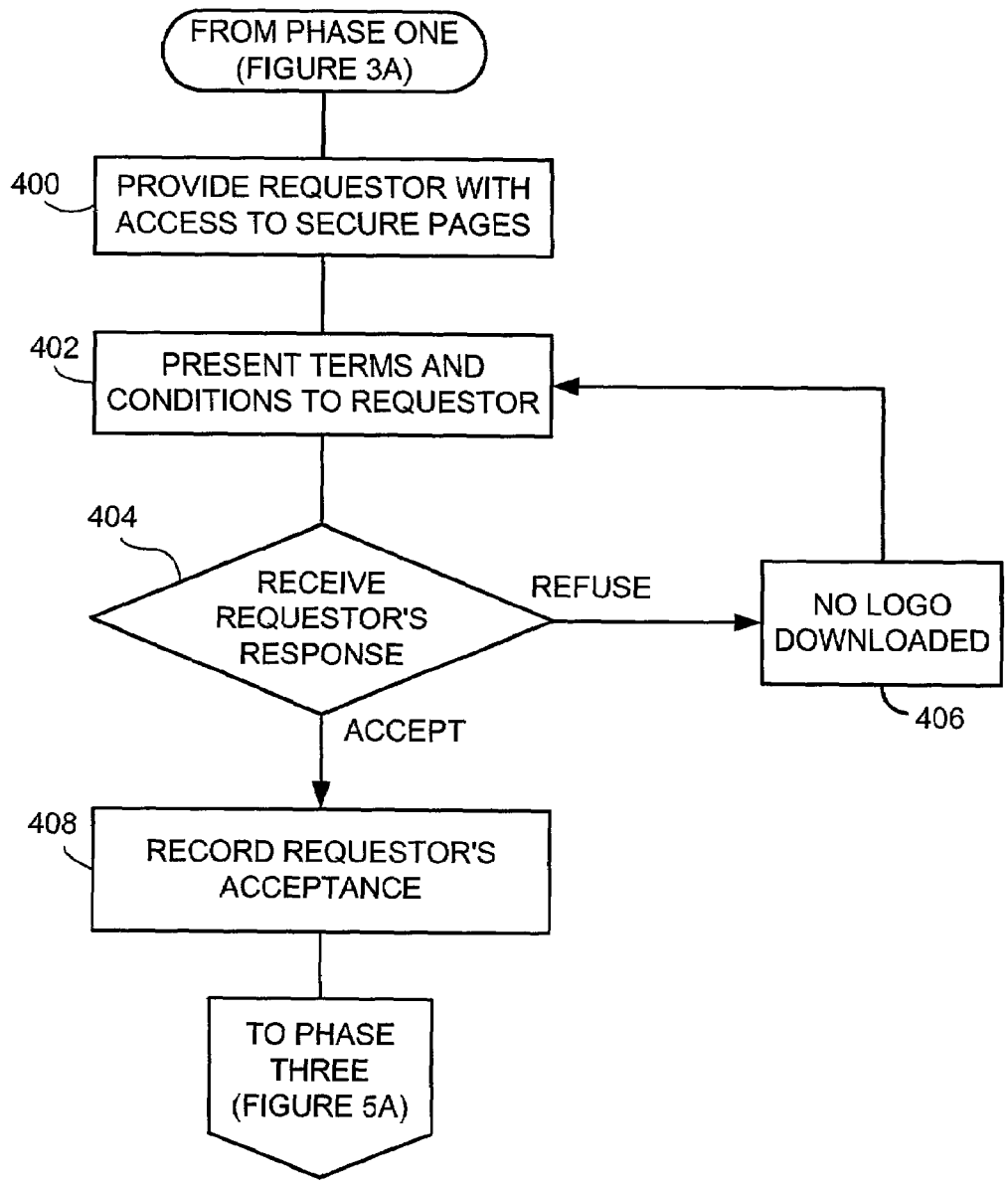
FIG. 4A is an exemplary flow chart outlining the terms and conditions phase of a method for managing sponsorships, according to an embodiment of the present invention.

FIG. 4A outlines the terms and conditions phase (phase 202 of FIG. 2). As shown, this phase begins in step 400 with the sponsor providing the requester with access to a first level of secured pages (e.g., a web site) over computer network 106. At this point in the process, the requester has received approval of the sponsorship (and perhaps also the payment), and is, for example, putting together materials promoting the charitable event. The requester, therefore, would like to advertise the sponsor's name in the promotional materials and needs the sponsor's official trademarks and logos to do so.

Figure 4C:
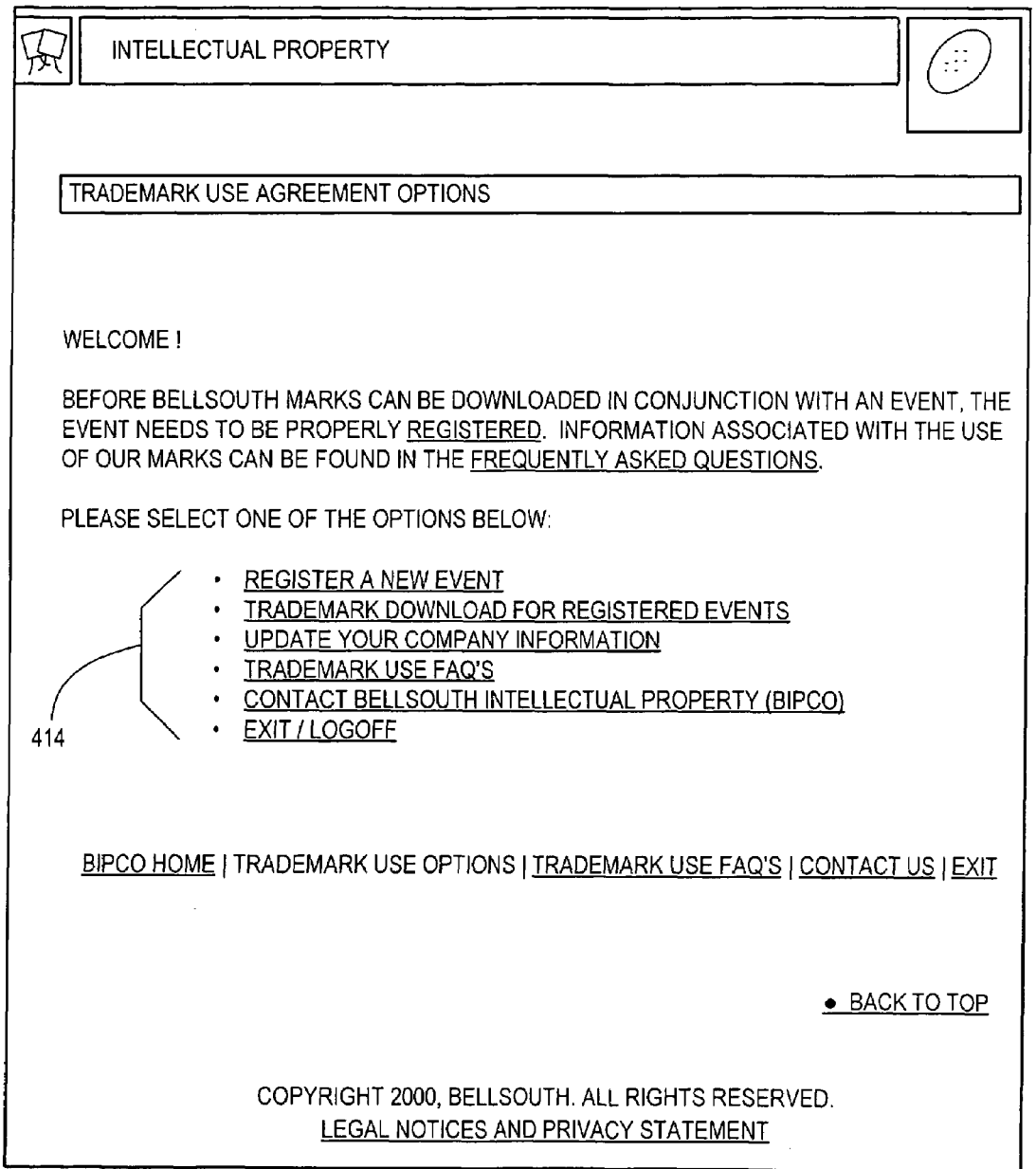
FIG. 4C is a screen image of an exemplary graphical user interface for navigating secured computer network pages of a sponsor, according to an embodiment of the present invention.

FIG. 4B illustrates an exemplary GUI for gaining access to the first level of secured pages as a part of step 400. As shown, the requester, through requester computer 102, enters her e-mail address and password in data fields 410 and 412, respectively. In response, sponsor application 112 consults requestor information database 118 to confirm that the e-mail address and password are correct, and that the requestor's account (i.e., password) has been activated. Following successful confirmation, sponsor application 112 displays a secured home page. FIG. 4C illustrates an exemplary GUI screen image of this secured home page 416, which provides options 414 for navigating the secured pages.

Figure 4E:
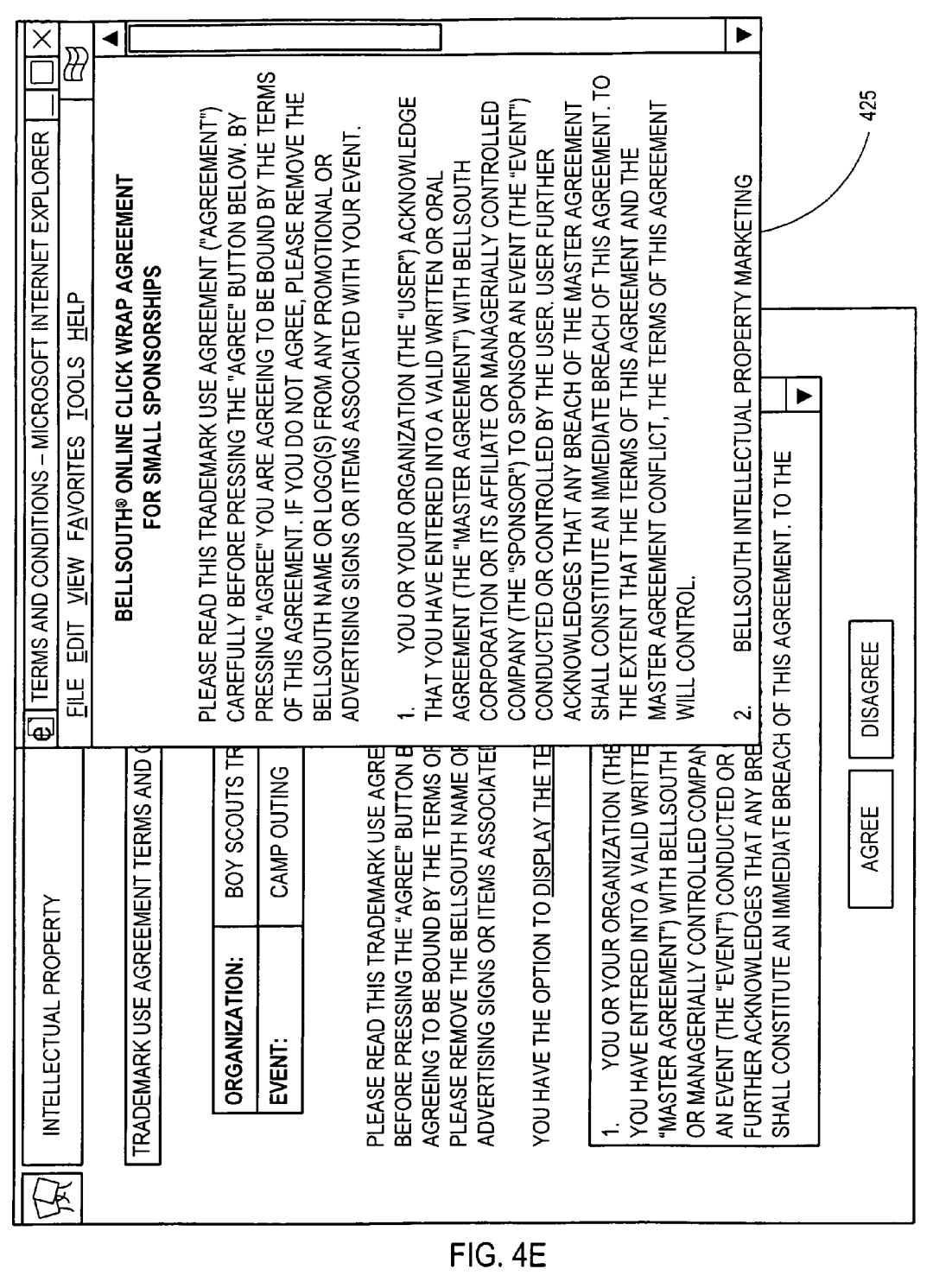

In step 402, the sponsor presents terms and conditions to the requester. Specifically, sponsor application 112 retrieves the terms and conditions from terms and conditions database 116 and displays a page containing the terms and conditions on requester computer 102. FIG. 4D illustrates an exemplary GUI page 418 that displays the terms and conditions in window 420. Page 418 also contains a heading 422 that lists the name of the requestor (described as an "organization" in FIG. 4D) and the event that the sponsor is sponsoring and that the requester is promoting. Page 418 also provides a link 424 to a pop-up window that displays the terms and conditions for printing. FIG. 4E illustrates an exemplary GUI page that includes this pop-up window 425.

As shown in FIG. 4D, exemplary page 418 also provides buttons 426 and 428 with which the requester responds to the posted terms and conditions. To gain access to a second level of secured pages, which contain further desired content (e.g., logos), the requester must agree to the terms and conditions. Sponsor application 112 checks to see if a requestor has agreed to the terms and conditions before displaying the second level of secured pages. If no agreement is in place, sponsor application 112 displays the terms and conditions for the requestor's acceptance.

Thus, continuing with the terms and conditions phase of FIG. 4A, in step 404, the requester selects either to refuse the terms and conditions by clicking the disagree button 426, or to accept the terms and conditions by clicking the agree button 428. The requester makes this selection on page 418, which is displayed on requester computer 102 by network browser application 110. Sponsor application 112 receives the selection from requester computer 102 through computer network 106.

If, in step 404, the sponsor receives the requestor's refusal (i.e., the requester clicked disagree button 426), then, in step 406, the terms and conditions phase ends and the sponsor denies the requester access to the desired content (e.g., trademarks or logos) on a second level of secured pages. As part of this denial, sponsor application 112 displays a page to the sponsor restating the sponsor's requirement that the requester agree to the terms and conditions before gaining access to the desired content. FIG. 4F illustrates an exemplary GUI page 430 displayed by sponsor application 112 at this point in the process. As shown, page 430 includes the restatement of the policy 432. Page 430 also provides a link 434 that returns the requester to the terms and conditions page 418 (FIG. 4D) for reconsideration of the agreement. Thus, the process returns to step 402 at which point sponsor application 112 again displays the terms and conditions to the requester, and gives the requester another opportunity to accept the agreement by clicking agree button 428 (FIG. 4D).

If, in step 404, the sponsor receives the requestor's acceptance of the terms and conditions (i.e., the requester clicked agree button 426), then, in step 408, sponsor application 112 records the requestor's acceptance in requester information database 118. The record enables the requester to gain access to the second level of secured pages, which contain links to download the desired content.

Alternatively, in recording the requestor's acceptance in step 408, sponsor application 112 also enters a date stamped record of the acceptance. In this manner, the sponsor can set a finite period during which the requestor's terms and conditions agreement is valid. After this period expires, the sponsor can then require the requester to re-acknowledge the terms and conditions prior to gaining access to additional web site content.

Figure 4G:
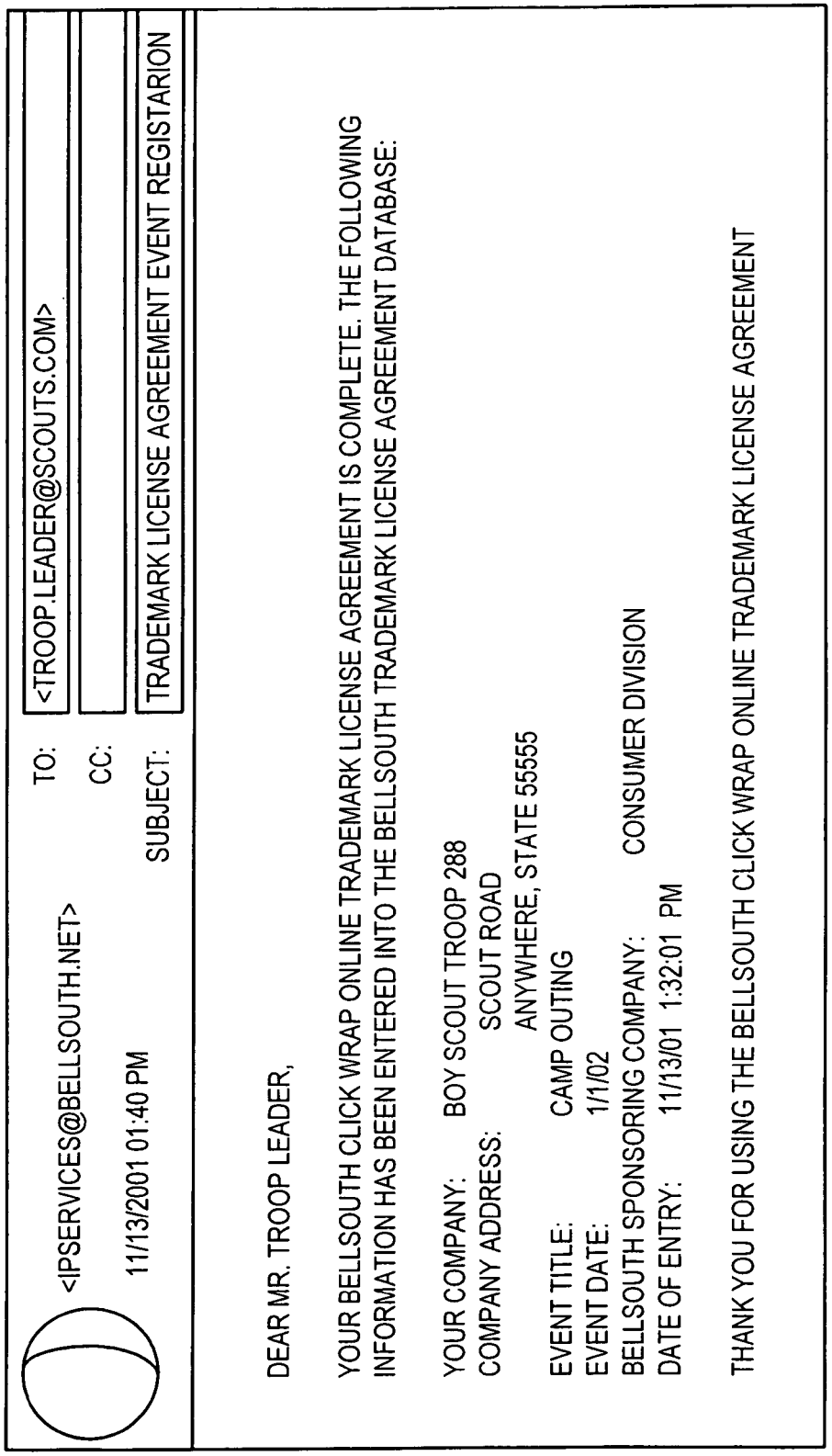
FIG. 4G is a screen image of an exemplary e-mail message confirming a requestor's acceptance of terms and conditions, according to an embodiment of the present invention.

As an optional part of step 408, sponsor application 112 can also use e-mail application 120 to forward an e-mail message to the requestor, confirming that the sponsor has received the requestor's acceptance of the terms and conditions, that the information provided by the requester has been entered into requester information database 118, and that the requester can now access the second level of secured pages, which contain links to download the desired content. FIG. 4G illustrates an exemplary e-mail message sent as a part of step 408.

As described above, the sponsor's web site pages can have multiple levels of access. For instance, as in shown in the flow charts of FIGS. 3A and 4A, a requester receives a password to access a first level of secured pages, and then, to access further desired content on the web site (e.g., logos), must agree to terms and conditions to access a second level of secured pages. Although this example describes two levels of access, access to content on a sponsor's web site could, of course, be controlled at several different levels. For example, a sponsor could make certain pages accessible only to requesters that have registered a profile, or to requesters that have registered a profile that has been verified by the sponsor. A sponsor could make other pages accessible only to requesters that have registered a profile and have also agreed to terms and conditions set out by the sponsor. A sponsor could make still other pages accessible to any requester with a valid password. To provide this secured access, each secured page could include one or more of the following properties: (1) a unique page identification; (2) the file name of the page; (3) the partial Internet Protocol address of the requestor, if necessary; (3) a unique password for restricting access, if necessary; (4) an identification of terms and conditions that must be acknowledged; and (5) a collection identification, if the page belongs to a certain subset of collection of information.

Returning to FIG. 4A, with the terms and conditions accepted, the requester is able to access the secure, download pages displayed by sponsor application 112. The conclusion of step 408 marks the end of the terms and conditions phase (phase 202 of FIG. 2).

FIG. 5A outlines the download and monitor phase (phase 204 of FIG. 2). As shown, this phase begins in step 500 with sponsor application 112 downloading the desired content to the requestor. FIG. 5B illustrates an exemplary GUI page 530 displayed by sponsor application 112 at this point in the process. As shown, page 530 displays descriptions and images of desired content, which in this example include logos and registered trademarks. Page 530 provides notification 532 to the requester that the requester must provide samples of how the desired content will be used. Finally, page 530 provides links 534 for downloading the content in a variety of file formats (e.g., EPS and JPEG).

After the requester has chosen and downloaded the desired content, in step 502, the sponsor forwards a communication to the requester asking for a sample use of the content. This communication could be conventional correspondence such as a mailed letter or a telephone call. Preferably, however, the communication is an automatically generated electronic communication. As an example, the electronic communication could be a web page displayed on requestor computer 102 using network browser application 110 (e.g., a pop-up window or frame) or could be a message posted on the secured pages accessible to the requester. As another example, the electronic communication could be an e-mail message to the e-mail address listed for the requestor in the requester information database 118. In any case, the electronic communication would preferably include a hyperlink to automatically respond to the communication and to automatically take the requestor to a page for uploading the sample use to sponsor server 104.

The sponsor sends the communication any time after the desired content is downloaded. For example, the sponsor can send the communication a predetermined duration after the requestor downloads the desired content. As another example, timing of the communication can depend on the particulars of the event being promoted (e.g., sent one month before the event).

In an embodiment of the present invention, monitor application 122 automatically generates the electronic communication of step 502. As an example, monitor application 122 consults requestor information database 118, which could include data such as the names and contact information of the requestors, information about the reasons for the requests (e.g., charity events), and indications of which content (e.g., which trademarks) the requestors have downloaded. Monitor application 122 could sort the data to determine which requestors should receive requests for sample uses of the downloaded content. Monitor application 122 could produce reports listing this sorted data for the sponsor's review. In addition, monitor application 122 could automatically generate requests for sample uses based on the results of the sorting and other preset criteria (e.g., monthly, quarterly, or annually). For example, monitor application 122 could automatically generate and send a request for sample uses to all requestors associated with a particular charity event one month prior to the event.

In step 504, sponsor application 112 determines whether it has received a response to the communication sent in step 502 within a specified time. The specified time would vary according to the particulars of each implementation, depending on, for example, how long it would reasonably take the requestor to respond with a sample use.

If no response has been received (a "NO" response in step 505), then, in step 506, sponsor application 112 determines whether the requestor has had an ample opportunity to provide sample uses of the content. In this example, the test for ample opportunity is based on the number of communications forwarded to the requestor. Thus, in step 506, if less than three communications have been sent, then, returning to step 502, the sponsor simply forwards another communication to the requester asking for a sample use of the content.

If, however, the sponsor determines that three or more communications have been sent without a proper response, then the sponsor revokes the requestor's privilege to download any more content, in step 508. As part of this revocation, sponsor application 112 deactivates the password listed for the requester in the requestor information database 118. Optionally, as part of step 506, the sponsor also forwards another communication to the requester, notifying the requestor of the revocation and warning the requestor that the requester is not authorized to the use the downloaded content without submitting a sample to the sponsor.

Returning to step 504, if the requestor responds to the communication, then, in step 510, the sponsor provides the requester with means for uploading the sample use to sponsor server 104. As an example, if the sponsor forwards an electronic communication in step 502, the sponsor could provide a hyperlink in the electronic communication, which, when activated, would display a page for uploading the sample use to sponsor server 104. The requestor would upload an electronic copy of the sample use, which sponsor application 112 would then archive in requestor information database 118, in step 512.

After archiving the sample use, in step 514, the sponsor audits the sample for compliance with the required terms and conditions. Specifically, the sponsor evaluates the appearance of the sample use, comparing it against the guidelines set out by the sponsor.

In one embodiment of the present invention, in step 514, an employee of the sponsor manually inspects the sample use. For example, the employee would compare each feature of the sample use against the requirements defined for each feature in the stated terms and conditions.

In another embodiment of the present invention, in step 514, monitor application 122 application of sponsor application 112 performs an automatic, electronic audit of the sample use. For example, in the case of a logo, monitor application 122 could verify the proper dimensions and colors of the logo, and could check the logo's prominence in relation to other logos displayed in the promotional material. An example of a software application that could perform these functions of monitor application 122 is the image recognition software SOTISE™, produced by Technologies Sepia Inc. of Quebec City, Canada. Well-known software applications in the fields of optical character recognition, fingerprint recognition, and facial recognition could also be modified to serve as monitor application 122. In addition, well-known digital rights management and watermarking techniques could be implemented as part of monitor application 122. For example, monitor application 122 could use digital watermarking to trace trademarks and to distinguish authentic trademarks from adulterated marks.

In step 515, the sponsor, either through a manual audit by an employee or an automatic audit by monitor application 122, returns the results of its evaluation of the sample use, determining whether the sample use is approved or rejected. If the sample is approved ("YES" in step 515), then, in step 516, the approval is archived in requester information database 118 and the process ends. Preferably, also as a part of 516, the sponsor forwards a communication (e.g., an electronic communication such as an e-mail message) to the requester explaining that the particular sample use has been approved, but also, at the same time, stressing that additional uses of the content must be approved before being circulated to the public. The sponsor would also preferably forward periodic communications (e.g., biannually or annually) reminding the requester that additional sample uses of downloaded content must be submitted to the sponsor. In addition, if the requester downloads additional content (returning to step 500), then sponsor application 112 repeats the subsequent steps to obtain and audit the sample use of that additional downloaded content.

Returning to step 515, if the sponsor rejects the sample use, then, in step 518, the sponsor forwards a communication (e.g., an electronic communication such as an e-mail message) to the requester, notifying the requester that the sample use is improper and listing the terms and conditions again for review by the requester. The sponsor also notes the rejection in requester information database 118. Optionally, also as a part of step 518, the rejected sample is archived in requestor information database 118.

Then, in step 520, the sponsor determines whether the requester has had sufficient opportunity to provide an acceptable sample use of the content. In this example, the test for sufficient opportunity is based on the number of samples that have been rejected. Thus, if less than three samples have been rejected, then, returning to step 502, the sponsor forwards another communication to the requestor asking for a sample use of the content. The sponsor determines the number of sample rejections by consulting requestor information database 118.

If, however, the sponsor determines that three or more samples have been rejected, then the sponsor revokes the requestor's privilege to download any more content, in step 508. As described above for step 508, as part of this revocation, sponsor application 112 deactivates the password listed for the requester in the requestor information database 118. Optionally, the sponsor also forwards a communication (e.g., an electronic communication such as an e-mail message) to the requestor, notifying the requestor of the revocation and warning the requestor that the requester is not authorized to the use the rejected sample.

In a further embodiment of the present invention, a sponsor uses the above-described system and processes to track the content that is being accessed by individual requestors. According to this embodiment, sponsor application 112 maintains an access log, preferably stored in requestor information database 118. As an example, when a requestor attempts to access a secured page, sponsor application 112 captures one or more of the following: (1) the Internet Protocol address of the requestor; (2) the access status (e.g., whether the secured content was displayed and, if not, why it was denied); (3) the date of the attempted access; (4) the profile identification of the requestor accessing the secured content; and (5) the identification of the secured page. Thus, with the information in the access log, the sponsor can track the requestor's interactions with the sponsor's web site. A sponsor can use this tracking tool to determine, for example, which requestor's must be contacted to provide them with brand collateral updates corresponding to content they have accessed and downloaded.

Although the embodiments described above illustrate the present invention in the context of sponsorship agreements, one of ordinary skill in the art would appreciate that the present invention is useful for managing many types of agreements. For example, the present invention could be used to manage agreements between principals and their authorized agents. In this way, if an authorized agent wishes to advertise to third parties its relationship with the principal, then the principal can require the agent to accept certain terms and conditions, and can provide the agent, under the prescribed conditions, with content that facilitates such advertisement. For this reason, and notwithstanding the particular benefits associated with using the present invention to manage sponsorship agreements, the system and method described herein should be considered broadly useful for accepting and responding to solicitations from requesters, requiring the requestors to enter an agreement, providing the requesters with content associated with the agreement, and monitoring the requesters' uses of the content.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention. Furthermore, although certain steps are described as being performed automatically, one skilled in the art can readily appreciate that the steps may be performed manually without departing from the spirit and scope of the present invention.

What is claimed is:

1. A method for managing sponsorships comprising the steps of:

electronically receiving, at a computer network site, a request for sponsorship from a requester, wherein the request for sponsorship from the requestor includes a request that an entity provide sponsorship as a sponsor according to the request for sponsorship from the requestor;

responding to the request for sponsorship from the requester by determining whether to approve the request for sponsorship from the requester;

responsive to the request for sponsorship from the requestor being approved, sending a request to the requestor to accept an agreement, wherein the agreement is an agreement between the sponsor and the requestor regarding terms and conditions for use of controlled sponsor content that is otherwise not available to the requestor;

responsive to receiving acceptance by the requestor of the agreement between the sponsor and the requester regarding terms and conditions for use of the controlled sponsor content that is otherwise not available to requester, providing the requestor with access to the controlled sponsor content through the site and transmitting the controlled sponsor content to the requestor;

sending a communication to the requestor asking for a sample use of the controlled sponsor content for monitoring actual use by the requestor of the controlled sponsor content;

receiving the sample use of the controlled sponsor content from the requester;

determining whether the sample use of the controlled sponsor content complies with the agreement between the sponsor and the requestor regarding the terms and conditions for use of the controlled sponsor content; and responsive to the sample use of the controlled sponsor content not complying with the agreement between the sponsor and the requester regarding the terms and conditions for use of the controlled sponsor content, sending a communication to the requestor citing improper use of the controlled sponsor content and terminating access for the requestor to the controlled sponsor content through the site.

2. The method of claim 1, further comprising the steps of:
sending a second communication to the requestor asking for a second sample use of the controlled sponsor content;
receiving the second sample use from the requester; and
determining whether the second sample use complies with the agreement between the sponsor and the requestor regarding the terms and conditions for use of the controlled sponsor content.

3. The method of claim 1, further comprising the step of repeating the steps of sending the communication, receiving the sample use, and determining whether the sample use complies with the agreement, until the sample use complies with the agreement or until a predetermined number of noncompliant uses have been received.

4. The method of claim 1, further comprising the steps of:
repeating the steps of sending the communication, receiving the sample use, and determining whether the sample use complies with the agreement; and
if more than a predetermined number of sample uses have been determined not to comply with the agreement, terminating access for the requestor to the controlled sponsor content through the site.

5. The method of claim 1, further comprising the step of archiving the sample use.

6. The method of claim 1, wherein if the sample use complies with the agreement, the method further comprises the step of archiving the compliance of the sample use.

7. The method of claim 1, wherein the communication is an electronic communication comprising one of a computer network page, a message posted on a computer network page, and an e-mail message.

8. The method of claim 1, wherein the step of determining comprises analyzing the sample use with image recognition software.

9. The method of claim 1, wherein the step of monitoring comprises the steps of:
sending an electronic communication to the requestor asking for a sample use of the content; and
if no sample is received from the requestor, terminating the requestor's access to the content through the site.

10. The method of claim 1, wherein the request includes one or more of a name of the requester, an address of the requester, a telephone number of the requestor, a description of an event for which a sponsorship is sought, a date and duration of the event, an e-mail address of the requester, a requested donation amount, a name of a contact person who directed the requestor to the site, and a password for accessing secured pages of the site.

11. The method of claim 10, wherein the step of responding comprises the steps of:
releasing a payment to the requester for the requested donation amount; and
activating the password.

12. The method of claim 1, wherein the step of responding comprises the steps of:
receiving a payment from the requester; and
activating a password.

13. The method of claim 1, wherein the controlled sponsor content is one of a trademark, a logo, and a copyrighted material.

14. The method of claim 1, wherein the request is one of an e-mail message and an online form completed on the site.

15. The method of claim 1, wherein the step of monitoring comprises tracking which controlled sponsor content is accessed by the requestor.

16. The method of claim 15, wherein tracking comprises recording, at a point when the requestor attempts to access a secured page of the site, at least one of an Internet Protocol address of the requester, an access status, a date of the attempted access, a profile identification of the requester, and an identification of the secured page.

17. A method for managing a sponsorship by a sponsor comprising the steps of:
receiving, from a requester, a request for sponsorship at a computer network site, wherein the request for sponsorship includes a request that an entity provide sponsorship as a sponsor according to the request for sponsorship;
receiving, at the site, from the requester, a name of a contact person who directed the requestor to the site;
receiving, at the site, information about the requested sponsorship from the requestor;
evaluating the request for sponsorship;
sending an electronic communication to the requestor indicating whether the request for sponsorship is approved, including, responsive to the request being approved, sending a request to the requestor that the requestor accept an agreement between the requester and the sponsor regarding terms and conditions for use of protected content of the sponsor that is otherwise not available to the requestor;
if the request is approved and the agreement is accepted by the requester, providing the requestor with access to the protected content of the sponsor;
sending an electronic communication to the requestor asking for a sample use of the protected content of the sponsor;
receiving from the requestor the sample use;
determining whether the sample use complies with the terms and conditions;
sending an electronic communication to the requestor indicating whether the sample use complies with the terms and conditions; and
responsive to the sample use not complying with the terms and conditions, terminating access for the requester to the protected content of the sponsor.

18. The method of claim 17, further comprising storing, as an origin of the request, the name of the contact person.

19. The method of claim 17, wherein the protected content is adapted to advertise the sponsorship.

20. The method of claim 17, wherein the electronic communication is one of an e-mail message and a message posted on the site.

21. The method of claim 17, wherein the step of evaluating comprises electronically comparing the request against a list of approved requestors and prescribed donation limits.

22. The method of claim 17, wherein if the request is approved, the method further comprises the step of receiving a payment from the requestor for the sponsorship.

23. The method of claim 17, wherein if the request is approved, the method further comprises the step of releasing a payment to the requestor for the sponsorship.

24. The method of claim 23, wherein a password is associated with the payment, and wherein the password provides the access to the protected content.

25. The method of claim 24, wherein the password is at least one of a number of a paper check and a code of an electronic payment.

26. The method of claim 17, wherein the step of determining whether the sample use complies comprises analyzing the sample use with image recognition software.

27. The method of claim 17, wherein the step of determining whether the sample use complies comprises manually inspecting the sample use.

* * * * *